F. F. LANDIS.

DISCHARGER FOR PNEUMATIC STRAW ELEVATORS.

No. 11,512. Reissued Nov. 12, 1895.

WITNESSES:

H. B. Nealy.

J. A. Walsh.

INVENTOR

Frank F. Landis,

BY

Chester Bradford,

ATTORNEY.

UNITED STATES PATENT OFFICE.

FRANK F. LANDIS, OF WAYNESBOROUGH, PENNSYLVANIA.

DISCHARGER FOR PNEUMATIC STRAW-ELEVATORS.

SPECIFICATION forming part of Reissued Letters Patent No. 11,512, dated November 12, 1895.

Original No. 512,557, dated January 9, 1894. Application for reissue filed September 12, 1895. Serial No. 562,340.

*To all whom it may concern:*

Be it known that I, FRANK F. LANDIS, a citizen of the United States, residing at Waynesborough, in the county of Franklin and State of Pennsylvania, have invented certain new and useful Improvements in Dischargers for Pneumatic Straw-Elevators, of which the following is a specification.

This invention relates to dischargers used in thrashing-machines in connection with the pneumatic straw elevators and stackers; and it consists in the novel construction and combination of the parts, whereby various advantages are secured, as will be hereinafter fully described and claimed.

Figure 1:
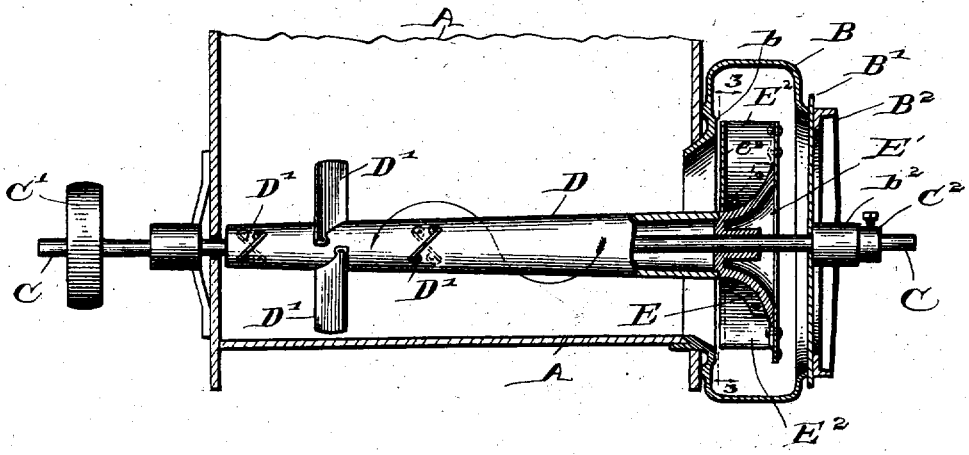
Figure 2:
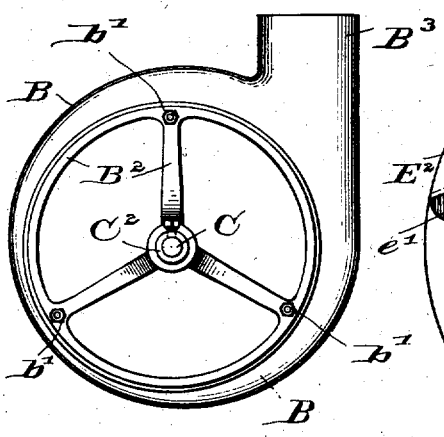
Figure 3:
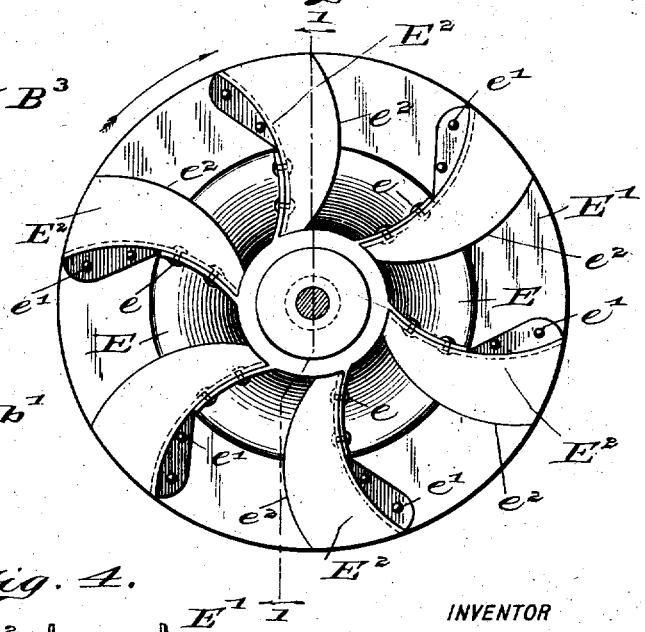
Figure 4:
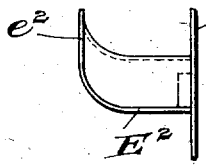

Referring to the accompanying drawings, which are made a part hereof and on which similar letters of reference indicate similar parts, Figure 1 is a sectional view through the discharger or fan as seen when looking in the direction indicated by the arrows from the dotted line 1 1 in Fig. 3, showing also the surrounding casing and a portion of the thrashing-machine or separator-casing. Fig. 2 is a side elevation of the fan or discharger casing separately; Fig. 3, a detail inside elevation of the discharger or fan separately, as seen from the dotted line 3 3 in Fig. 1, the casing being removed; and Fig. 4, a detail end view of one blade of the discharger or fan.

In said drawings the portions marked A represent the casing of a grain-separator or thrashing-machine; B, the fan or discharger casing which is secured to the side of said separator; C, a shaft mounted in the lower rear end of the machine upon which the parts embodying the principal features of my present invention are mounted; D, a barrel or drum on said shaft; and E, the fan or discharger hub, also mounted on said shaft C.

The thrashing machine or separator, of which a fragment A of the casing is shown, is or may be of any ordinary or desired form or construction, and as it is not peculiar to my present invention will not be further described herein, except incidentally in describing said invention.

The fan or discharger casing B is secured to one side of the separator-casing A, near the lower side and rear end thereof, and incloses the discharger or fan. The outer end of said casing is inclosed by the preferably-removable plate B′, and on the outside of this plate is secured the spider $B^2$, at the center of which is a hub $b^3$, which forms one of the bearings for the shaft C. Said plate and said spider are secured to the casing proper by the bolts $b'$. These parts are thus removable and ready access is thus provided to the fan or discharger casing from the outside, and through the opening left when these parts are removed the discharger and attached parts can be inserted and removed, as desired, which is a matter of considerable convenience. On the other or inner side of the discharger-casing an opening is provided, which leads into the straw-chamber within the separator-casing A. I have shown and prefer to construct this opening of a conical form as the straw and chaff are thus enabled to be more readily moved from the straw-chamber into the discharger-casing, as will be readily understood by an examination of Fig. 1 of the drawings. Said opening is preferably surrounded by a lip $b$, near which the edges of the fan-blades revolve. The casing B develops into a discharge or outlet pipe $B^3$, which is connected with the usual chute (not shown) leading to the point where the straw is to be finally discharged as in other pneumatic stackers.

The shaft C is mounted in suitable bearings $a$ and $b^2$, and is driven by a suitable belt (not shown) running to the pulley C′ thereon. It carries the fan or discharger and the conveyer leading thereto.

The barrel or conveyer-body D is mounted on the shaft C, and extends transversely across the straw-chamber within the separator-casing, as shown, and is preferably somewhat conical in form. Secured to this barrel or body are inclined wings D′, (known variously as "conveyer-blades" and "conveyer-flights,") by which the straw and chaff are urged transversely of the straw-chamber and, parallel with the shaft, into the inlet of the discharger or fan casing. It will be observed that by this arrangement the fan or discharger is located to one side of the separator, removing a large portion of the obstruction which would otherwise exist in the straw-chamber, while at the same time, by means of the conveyer-construction described, I am enabled to remove the straw and chaff from said chamber with great efficiency.

The fan or discharger consists, in the construction shown, of a hub E, mounted on the shaft C, a disk or plate E′, on the outer side, and wings $E^2$, secured to said hub and said disk on the inner side by bolts or rivets *e e′*; but the hub, the disk, and the blades may all be cast in one piece instead of being formed separately and secured together, as herein shown. As illustrated, the blades $E^2$ have portions $e^2$ extending into a parallel relation with the disk E′, while the main portions of said blades are at right angles with said disk, as is clearly illustrated in the drawings, particularly in Fig. 4.

The operation of my machine may be described as follows: The straw, after being thrashed in the usual manner, falls into the straw-chamber within the lower rear portion of the casing A. The straw and chaff are thence forced into the fan or discharger casing B by the suction of the fan and the operation of the inclined wings or conveyer blades or flights D′. The air and straw drawn and forced into the discharger-casing are forced up the outlet-pipe $B^3$ by the action of the revolving discharger or fan. The portions $e^2$ of the blades catch the straw, and the main portions $E^2$ discharge it up the outlet or discharge pipe. The straw is flung off by the discharger-blades at the same velocity as the air, and is kept in motion by the blast of air thrown off with it by the discharger. When a bunch of straw strikes the part $e^2$ of a blade and is drawn between said part and the lip *b*, the discharger slides automatically away from the lip and permits the straw to pass. The discharger then resumes its original position automatically. This is permitted by so mounting the shaft C in its bearings as to allow it to slide longitudinally in said bearings in one direction, its movement in the other direction being limited by a suitable collar or shoulder, as $C^2$, which comes in contact with a suitable bearing, as the bearing $b^2$ on the spider $B^2$. The tendency of the force of the air-pressure in the fan casing behind the disk E′ is to move the discharger and its shaft endwise and keep the collar in contact with the bearing; but it will yield sufficiently when straw is jammed in between the discharger blades and the lip or throat around the ingress-opening to permit the straw to pass as above stated, after which the force of the air-pressure returns it immediately to position. The straw which is drawn in near the center of the discharger is caught by the portions $e^2$, which prevent it from being thrown back into the inlet leading into the straw-chamber. I have ascertained that when the discharger-blades are constructed in this manner the discharger will do at least as much work when driven at a less velocity as it will when driven at a higher velocity if the blades are constructed without the portions whereby channels are formed in their faces, besides securing the other advantages above specified.

Having thus fully described my said invention, what I claim as new, and desire to secure by Letters Patent, is—

1. The combination, in a pneumatic straw elevator, with the straw chamber, of a discharger or fan embodying a disk on one side, and a series of blades secured to one side of said disk; each blade being provided with a portion substantially parallel to the disk, and forming together with the adjacent portion of the disk the sides and bottom of a channel in the face of the blade.

2. A discharger provided with a hub, a disk on one side, and a series of blades, each said blade being provided with a portion substantially parallel to the disk and forming, together with the disk, the sides and bottom of a channel in the front face of the blade, substantially as set forth.

3. A discharger provided with a central hub having a concave plate, a flat circular disk at the larger end of said plate, and a series of rearwardly curved blades, each provided with a portion substantially at a right-angle to the disk, and a portion substantially parallel with the disk, said portions being connected together, substantially as set forth.

4. The combination, in a pneumatic straw elevator, of a casing located at one side of the chamber into which the straw falls after being thrashed and having an opening which communicates with said chamber, a centrifugal discharger or fan located in said casing, the shaft whereof extends into said straw chamber, and inclined wings or conveyer blades or flights carried by said shaft, whereby the straw and chaff may be urged toward and into said discharger or fan casing.

5. The combination, in a pneumatic straw elevator, of a casing secured to one side of the straw chamber and provided with an opening leading into said chamber, of a fan or discharger located in said casing consisting of a disk on the opposite side thereof from the opening, and wings secured to said disk between it and said opening, a conveyer on the same shaft as the fan and located in the straw chamber and which operates to move the straw and chaff sidewise toward the fan or discharger.

6. The combination, with the chamber for receiving the straw, of the longitudinally movable discharger shaft, a barrel secured on the said shaft inside the said chamber and provided with inclined projecting wings, the discharger casing provided with a conical inlet and a projecting annular lip, a discharger secured on the said shaft and provided with a flat disk on one side, and a collar secured on the said shaft and preventing the discharger from touching the said lip, substantially as set forth.

7. The combination, in a pneumatic straw elevator, of a casing located at one side of the chamber into which the straw falls after being thrashed and having an opening which communicates with said chamber, a centrifugal discharger or fan located in said casing, a barrel or drum in said straw chamber mounted on the same shaft as the discharger or fan, and inclined wings or conveyer blades or flights secured to said barrel or drum, whereby the straw and chaff may be urged toward and into said discharger or fan casing.

8. The combination, with the discharger, of the discharger casing provided with an inlet on one side and an opening for inserting the discharger on the other side, a plate closing the said opening, a spider having a hub for supporting one of the discharger-shaft bearings, and bolts securing the said spider and plate to the casing, substantially as set forth.

9. The combination, with the discharger, of the discharger casing provided with an inlet on one side and an opening for inserting the discharger on the other side, a removable cover plate closing the said opening, and means for securing the cover plate to the casing, substantially as set forth.

In witness whereof I have hereunto set my hand and affixed my seal, at Indianapolis, Indiana, this 7th day of September, 1895.

FRANK F. LANDIS. [L. S.]

Witnesses:

CHESTER BRADFORD,
JAMES A. WALSH.